June 21, 1960   E. E. WISHAW   2,941,842
UNLOADER FOR GRAIN ELEVATORS ETC.
Filed Dec. 16, 1957
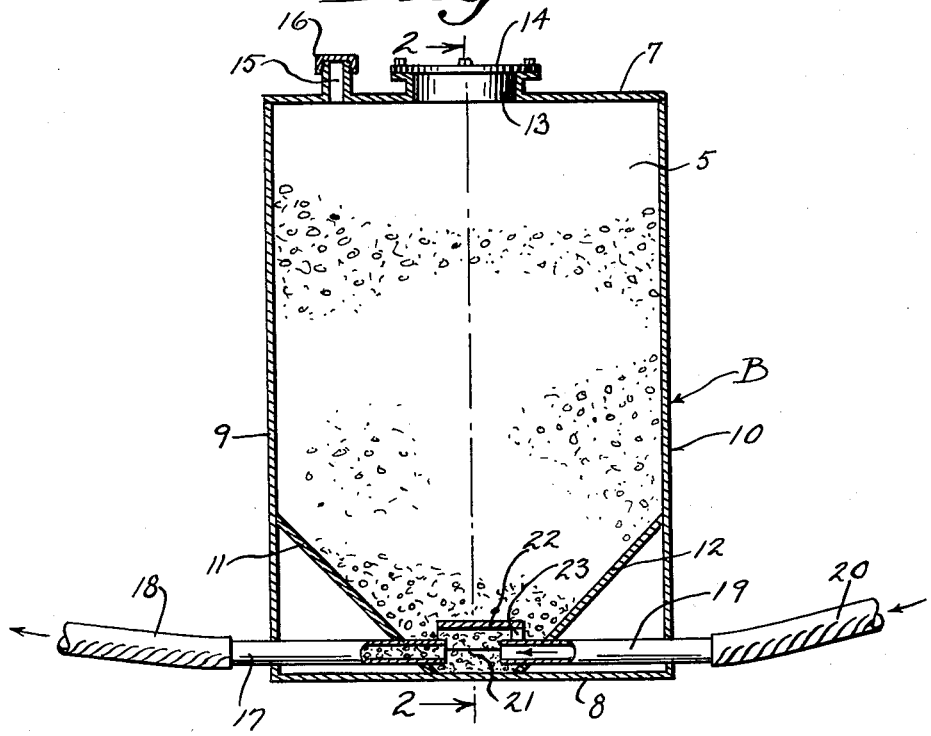
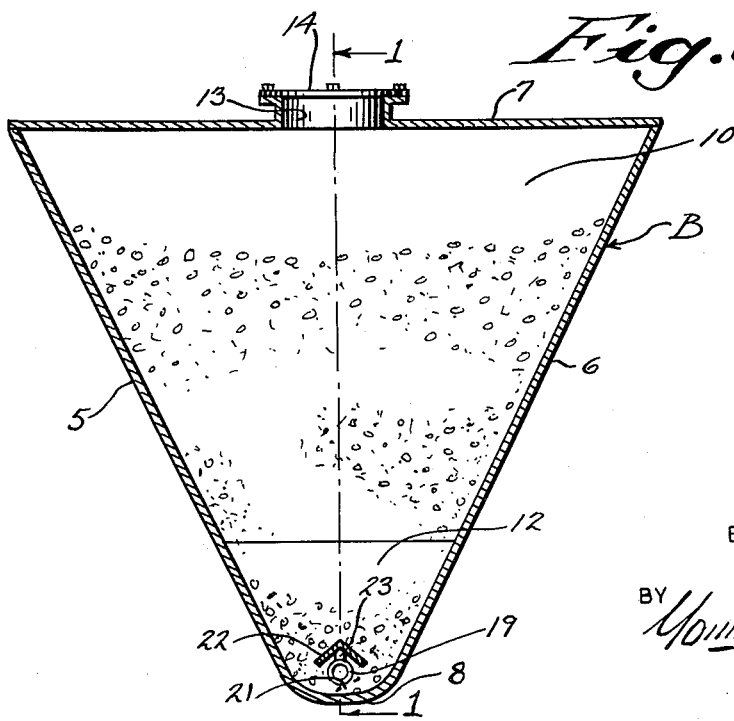
INVENTOR
EDGAR E. WISHAW
ATTORNEYS

United States Patent Office 2,941,842
Patented June 21, 1960

2,941,842
UNLOADER FOR GRAIN ELEVATORS, ETC.
Edgar E. Wishaw, 4315 Goley Lane, Racine, Wis.
Filed Dec. 16, 1957, Ser. No. 702,947
1 Claim. (Cl. 302—52)

This invention appertains to the transfer of fluent material from one place to another and more particularly to the unloading of grain from bins or elevators either of the stationary or mobile type.

One of the primary objects of my invention is to provide a novel bin or hopper for the storage or transfer of grain embodying a novel means for the introduction of an air stream at a desired point in the bin and relative to a grain outlet so that the grain will be carried with the air stream to and through the outlet.

Another salient object of my invention is the provision of a grain bin or hopper having a tapered lower end with a grain outlet conduit and an inlet conduit for air under pressure communicating with the bin at the lower, tapered end thereof, the air inlet conduit being spaced from but in longitudinal alignment with the conduit for grain so that the flow of air will pick up the grain and carry the same through the grain conduit to a desired place.

A further important object of my invention is the provision of a novel guard bridging the gap between the conduit for air and the conduit for grain, whereby to prevent the too-rapid flow of grain to the conduit and to prevent the clogging up of the conduit.

A still further object of the invention is the provision of a sealed bin with a conduit for air under pressure and a conduit for grain so that a pressure can be built up in the bin high enough to equal and overcome any back pressure caused by the friction of the grain in the conduit for the grain.

A still further important object of my invention is the provision of an exceptionally simple and durable means for the quick unloading of grain from bins and the like.

With these and other objects in view, the invention consists in the novel construction, arrangement and formation of parts, as will be hereinafter more specifically described and claimed and illustrated in the accompanying drawing, in which drawing, Figure 1 is a horizontal sectional view through a bin or hopper constructed in accordance with my invention, the section being taken on the line 1—1 of Figure 2, looking in the direction of the arrows, and Figure 2 is a vertical sectional view taken at right angles to Figure 1 and on the line 2—2 of Figure 1, looking in the direction of the arrows.

Referring to the drawing in detail wherein similar reference characters designate corresponding parts throughout the several views, the letter B generally indicates the bin, hopper or the like for receiving grain or other free flowing granular material. The bin B can be mounted on a suitable supporting structure, not shown, or on the chassis of a vehicle.

The bin includes side walls 5 and 6 and these side walls taper downwardly toward one another from the top wall 7 to a bottom wall 8, which is preferably of an arcuate shape in cross-section. End walls 9 and 10 join the edges of the tapered side walls 5 and 6. The end walls 9 and 10 are provided with interior guide plates 11 and 12. These guide plates are secured to the end walls 9 and 10 at a point slightly above the bottom wall 8 and these guide plates taper inwardly and downwardly toward one another and are connected to the bottom wall 8. These plates 11 and 12 terminate short of one another at their lower ends, as is best shown in Figure 1 of the drawing. The top wall 7 is provided with a filler opening 13 and this opening is closed by a plate 14 to form an air tight connection. The top wall 7 is also provided with an outlet nipple 15 which can be closed by a cap 16.

Extending into the lower end of the bin B through the end wall 9 is an outlet pipe 17 and a hose 18, is detachably connected to this pipe. Also extending into the lower end of the bin but through the end wall 10 is a pipe 19 and this pipe has connected therewith a hose 20 and this hose is connected to the outlet end of any desired type of air pressure pump, not shown. The pipe 17 and the pipe 19 are disposed in longitudinal alignment but terminate in spaced relation to the center of the bin to form an air gap 21. Thus, when air under pressure rushes through the pipe 19 the air is directed toward the pipe 17 and flows into such pipe. The stream of air picks up the grain and carries the grain into and through the pipe 17 and hose 18 to its desired point.

In order to prevent the too rapid flow of grain to the gap 21 and to prevent the clogging up of the pipe 17, I provide a guard 22. This guard is of a V-shape in cross-section and can be secured in place in any desired way. As illustrated, I provide a bracket 23 which is secured to the guard and to the pipe 19. It is to be noted that the guard bridges the gap 21 and is disposed above the gap and continues slightly beyond the inner ends of the pipes 17 and 19.

In actual practice, the bin is filled with grain, as will be later set forth and the plate 14 is placed in position, as is the cap 16 and in effect the bin is now air tight. The air pressure is admitted to the hose 20 and for a short time part of the air will flow into the bin and this will raise the air pressure in the bin high enough to equal and overcome any back pressure caused by the friction of grain passing through the pipe 17 and the hose 18.

The bin B can be filled in various manners and one quick method is to extend a conduit from an elevator to the opening 13 and to connect an air suction hose with the neck 15. The flow of air through the neck will create a partial vacuum in the bin and enhance the flow of grain from a filling pipe into the bin.

The inner end of the pipe 19 can be in the form of a nozzle or jet and different sizes of nozzles or jets can be used according to the size of the bin, grain, air pressures and the like.

From the foregoing description, it can be seen that I have provided an exceptionally simple and effective means for permitting the quick unloading of grain from a bin without causing any damages to the grain.

Changes in details may be made without departing from the spirit or the scope of this invention, but what I claim as new is:

A quick unloading grain bin or the like comprising a hopper body having a downwardly tapered lower end, a pipe for air under pressure extending horizontally into the lower tapered end of the bin, an outlet pipe for the passage of grain extending horizontally into the lower end of the bin, the pipes terminating in spaced relation, but in longitudinal alignment to form an air gap, whereby flow of air into the bin will carry grain into the outlet pipe, and a guard disposed in the lower tapered end of the bin and arranged slightly above said pipes and bridging the gap between the inner facing ends of the pipes to hold the mass of grain above the gap, said guard being of an inverted V-shape in cross-section.

References Cited in the file of this patent
UNITED STATES PATENTS

| | | |
|---|---|---|
| 681,867 | Bardwell | Sept. 3, 1901 |
| 1,686,877 | Peik | Oct. 9, 1928 |
| 1,796,215 | Peikert | Mar. 10, 1931 |
| 2,027,697 | Nielsen | Jan. 14, 1936 |
| 2,303,810 | Anderson | Dec. 1, 1942 |
| 2,530,689 | Egger | Nov. 21, 1950 |
| 2,858,165 | Oliver | Oct. 28, 1958 |